(No Model.)

H. R. WALLIS.
NUT LOCK.

No. 472,413.               Patented Apr. 5, 1892.

Witnesses:                                    Inventor
Will's Norton                                 Howard R Wallis
W. E. Brundage              By his Attorney

UNITED STATES PATENT OFFICE.

HOWARD R. WALLIS, OF MUNCY, PENNSYLVANIA.

NUT-LOCK.

SPECIFICATION forming part of Letters Patent No. 472,413, dated April 5, 1892.

Application filed September 30, 1891. Serial No. 407,244. (No model.)

*To all whom it may concern:*

Be it known that I, HOWARD R. WALLIS, a citizen of the United States, residing at Muncy, in the county of Lycoming and State of Pennsylvania, have invented certain new and useful Improvements in Nut-Locks; and I do hereby declare the following to be a full, clear, and exact description of the invention, such as will enable others skilled in the art to which it appertains to make and use the same.

My invention relates to improvements in that class of nut-locks which are designated in the art as "base-washer" locks, and has for its object to provide a cheap and simple construction operating in a new and novel manner to effectually hold the nut against accidental turning.

To this end my invention may be said to consist generally in forming the washer constituting the lock with points or shoulders having sharp edges arranged when the nut is turned to the left to bite into the smooth inner face of the nut and the main body, these points or shoulders being arranged on both sides of the washer with the upper set at right angles to the lower set for the purpose of giving a spring action to the washer when the nut is in place, all of which will be presently fully and clearly explained.

Figure 1:
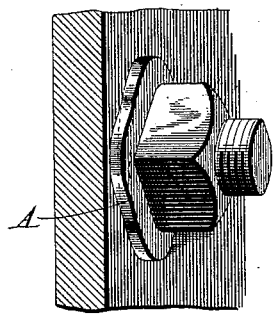
Figure 2:
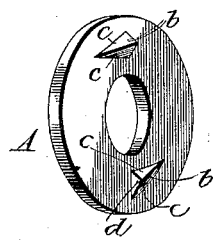
Figure 3:

Reference being had to the accompanying drawings, which form a part of this specification, Figure 1 indicates in perspective view my improved nut-lock in use; Fig. 2, a detail in perspective of the same detached; Fig. 3, an edge view, and Fig. 4 a perspective view of a modified form of construction.

The reference-letter A denotes the lock, which consists of a washer made from hard spring-steel and formed with projections $b$ extending from the upper and lower surface. These projections, as shown in Figs. 1, 2, and 3, are each formed of two inclined walls $c$ $c$ and the vertical wall $d$, which meet to form a sharp cutting-edge, which in operation bites into the inner surface of the nut and prevents the loosening of the same. These projections, preferably four in number, are arranged two on each side of the washer, the upper two being in a line at right angles to the line of the lower two, in order that the surface of the washer immediately under or on the side opposite to a projection shall be plain. By reason of this construction the pressure of the nut on the lock imparts a spring action to the washer and causes it to assume the shape shown in Fig. 1 and in dotted lines in Fig. 3. This spring action tends to keep the points or projections in contact with the nut and main body by taking up the slack which may occur from various causes. It also permits the tightening of the nut to any desired extent.

Figure 4:
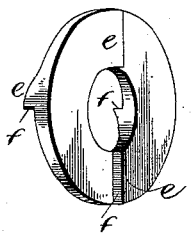

In Fig. 4 is shown a washer embodying all the features of the construction shown in Figs. 1, 2, and 3 with the exception that the projections are formed with a single inclined wall $e$ and a vertical wall $f$, together constituting a straight biting-edge adapted to operate in a manner similar to the construction hereinbefore described.

Any ordinary nut having a smooth inner surface may be employed with my improved lock, which renders the operation very simple.

The efficiency, durability, and cheapness of manufacture will be apparent from a reading of the above description.

I claim—

1. A nut-lock consisting of a plate or washer having abrupt shoulders formed on its upper and lower sides, the shoulders on the upper side being arranged in a line at right angles to the line of shoulders on the under side, for the purpose set forth.

2. A nut-lock consisting of a plate or washer having abrupt shoulders formed by inclined and vertical walls, said shoulders being arranged in pairs on both sides of the washer, the pair on one side being located in a line at right angles to the line of the shoulders on the other side, for the purpose set forth.

In testimony whereof I affix my signature in presence of two witnesses.

HOWARD R. WALLIS.

Witnesses:
THOS. LLOYD,
H. C. LEVAN.